June 8, 1948.     F. E. ALTMAN ET AL     2,443,156
ASTRONOMICAL PHOTOGRAPHIC OBJECTIVES
Filed Aug. 7, 1946
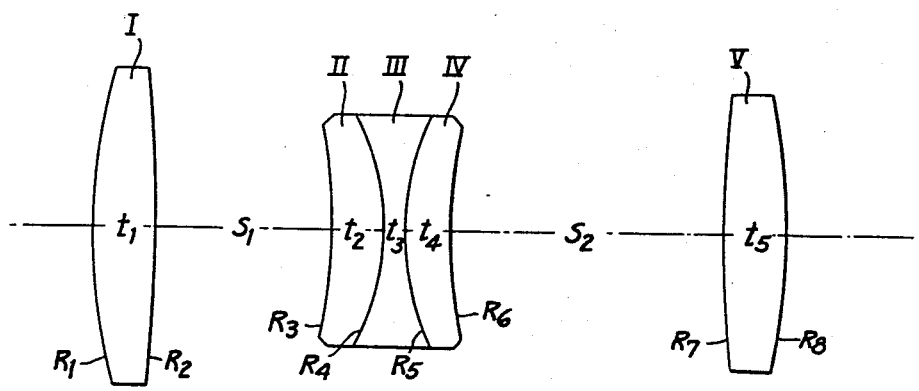
| EF = 100 mm. | | | | f/5.4 |
|---|---|---|---|---|
| LENS | $N_D$ | V | RADII | THICKNESSES |
| I | 1.697 | 56.1 | $R_1$ = + 37.77 mm. | $t_1$ = 3.94 mm. |
|  |  |  | $R_2$ = −206.8 | $S_1$ = 10.60 |
| II | 1.649 | 33.8 | $R_3$ = − 38.56 | $t_2$ = 3.16 |
| III | 1.617 | 36.6 | $R_4$ = − 14.46 | $t_3$ = 1.52 |
| IV | 1.620 | 60.3 | $R_5$ = + 16.59 | $t_4$ = 2.63 |
|  |  |  | $R_6$ = + 29.42 | $S_2$ = 16.6 |
| V | 1.611 | 58.8 | $R_7$ = +208.7 | $t_5$ = 3.95 |
|  |  |  | $R_8$ = − 40.54 | BF = 73.7 |
Fred F. Altman
Rae Wyland McIntyre
INVENTORS
BY *[signatures]*
ATTY & AGT Patented June 8, 1948

2,443,156

UNITED STATES PATENT OFFICE 2,443,156

ASTRONOMICAL PHOTOGRAPHIC OBJECTIVES

Fred E. Altman and Rae Wyland McIntyre, Rochester, N. Y., assignors to Eastman Kodak Company, Rochester, N. Y., a corporation of New Jersey Application August 7, 1946, Serial No. 688,846

3 Claims. (Cl. 88—57)

This invention relates to photographic objectives of the type consisting of a biconcave component air-spaced between two positive components, and particularly to those objectives of this type which are highly corrected to cover a small angular field and which are characterized by a wide spacing of the components.

This particular type of objective is known as the "astronomical photographic triplet" because of its early use in astronomy. It is useful in many applications where a sharp image is required over a small angular field. The length of such objectives is usually between 30% and 50% of the focal length and the nodal points lie within the lens, that is, between the vertices of the front and rear surfaces.

The object of the invention is to provide an objective of the above-described type which is very highly corrected for zonal spherical aberration and sphero-chromatic aberration.

According to the invention, the biconcave component is compound and consists of a biconcave element cemented between two positive meniscus elements of slightly higher refractive index. The three glasses are so chosen that the following mathematical relations are satisfied:

$$\pm(N_4-N_3) < 0.02$$
$$0.01 < (N_2-N_3) < 0.05$$
$$1.5\ V_3 < V_4 < 2.0\ V_3$$
$$0.85\ V_3 < V_2 < 1.05\ V_3$$

where N and V denote refractive index and dispersive index respectively and the subscripts 2, 3, and 4, pertain to the front, center, and rear elements of the cemented triplet component.

The front one of the two cemented surfaces, and preferably both, have radii of curvature less than one-fourth the focal length of the objective. These two cemented surfaces cooperate to correct the sphero-chromatism of the system, the one having a greater under-correcting effect on the aberration of the blue rays than on that of the red and the other restoring the chromatic correction of the objective but having very little effect on the spherical aberration. In addition to this, the zonal spherical aberration is greatly improved and may even be over-corrected at least insofar as the axial image point is concerned.

The invention lies principally in this structure of the biconcave component and may be embodied in objectives having various arrangements of the positive components. That is the positive components may be simple positive elements or one or both may be a cemented doublet or one may be split into two positive elements. These latter variations have been known for many years in astronomical triplets.

It is a common characteristic of all these variations of type however, that the outermost surface of each positive component has a dioptric power at least as great as that of any other surface in the same component.

The most usual form of triplet has, as its positive components, two simple positive elements. We have found that in objectives of this form, it is advantageous to have the index of the positive elements greater than 1.6, and preferably that of the front one should be greater than 1.66. The dispersive index should be greater than 45 in each case. These refractive indices may be as high as available glasses permit, but indices above 1.80 do not appear to give benefits commensurate with the greater cost of the glass.

By means of the preferred features which have been enumerated, we have been able to produce a lens having a very sharp image, exceptionally free from color fringes and zonal aberration.

The accompanying drawing shows a lens according to the invention and structural data for the same.

The table of data is repeated here for convenience.

Table I

EF=100 mm.   f/5.4

| Lens | N | V | Radii | Thicknesses |
|---|---|---|---|---|
| I | 1.697 | 56.1 | $R_1=+37.77$ mm. $R_2=-206.8$ | $t_1=3.94$ mm. $s_1=10.60$ |
| II | 1.649 | 33.8 | $R_3=-38.56$ | $t_2=3.16$ |
| III | 1.617 | 36.6 | $R_4=-14.46$ | $t_3=1.52$ |
| IV | 1.620 | 60.3 | $R_5=+16.59$ $R_6=+29.42$ | $t_4=2.63$ $s_2=16.6$ |
| V | 1.611 | 58.8 | $R_7=+208.7$ $R_8=-40.54$ | $t_5=3.95$ BF=73.7 |

In this table, as in the drawing, the lens elements are designated by roman numerals, and the corresponding refractive index for the D line of the spectrum and also the dispersive index are given. The radii of curvature $R$ of the refracting surfaces, the thickness $t$ of the lens elements, and the spaces $s$ between the components, each numbered by subscripts from front to rear, are given in the fourth ad fifth columns of the table. The back focal length BF is measured from the back surface of the lens to the principal focal plane.

This lens was designed to be made up in a focal length of more than 500 mm. and is corrected for the visual range of colors, that is from the C to the F line of the spectrum. The zonal spherical aberration is a little over-corrected and the sphero-chromatism is so perfectly corrected that all the C and F rays focus within an interval of 0.00075 F. along the axis, where F is the equivalent focal length of the objective.

The spherical and sphero-chromatic aberration for the C, D, and F rays of the spectrum are given in the following table, measured in each case from the D paraxial focus:

Table II

E. F.=100 mm.

|  | C | D | F |
|---|---|---|---|
| F/5.4 | +.045 mm. | −.005 | +.044 |
| F/7.6 | +.056 | +.030 | +.069 |
| Paraxial | +.061 | .000 | +.028 |

These data bear out the statement made in the preceding paragraph.

It is readily seen from Table I, above, that the objective of the example embodies all the features of the invention. Specifically $(N_4-N_3)$ equals 0.003 and $(N_2-N_3)$ is about eleven times as large, namely, 0.032. Also $V_4=0.92V_3$ and $V_2=1.65V_3$. In regard to the preferred features, both the cemented surfaces have radii of curvature smaller than one-fourth the focal length. Also the separate positive elements have refractive indices greater than 1.6 and dispersive indices greater than 45, the front component having a refractive index greater than 1.66, according to a preferred feature.

It may also be noted that the objective embodies several features common to nearly all known photographic triplets in general. Some of these features have already been indicated such as the radii $R_1$ and $R_8$ being less than $R_2$ and $R_7$ respectively. With rare and minor exceptions, photographic triplets have the focal length of the negative component numerically between 0.2 F and 0.4 F, and the rear surface of this component is between 0.99 and 4.5 times as strongly curved as its front surface. In the example shown above, the focal length of the biconcave component is numerically about 0.27 F and $R_6$ is about 0.76 $R_3$. Thus the example is typical of the class in this respect. It is principally by the internal structure of this component that the superior advantages of the invention are gained, and especially by the careful balancing of the refractive and dispersive index differences at the cemented surfaces.

What we claim is:

1. An objective as shown in the drawing and substantially according to the following table of specifications:

| Lens | N | V | Radii | Thicknesses |
|---|---|---|---|---|
| I | 1.70 | 56 | $R_1=+0.4F$<br>$R_2=-2F$ | $t_1=0.04F$<br>$s_1=0.1F$ |
| II | 1.65 | 34 | $R_3=-0.4F$ | $t_2=0.03F$ |
| III | 1.62 | 37 | $R_4=-0.15F$ | $t_3=0.03F$ |
| IV | 1.62 | 60 | $R_5=+0.2F$<br>$R_6=+0.3F$ | $t_4=0.03F$<br>$s_2=0.2F$ |
| V | 1.611 | 59 | $R_7=+2F$<br>$R_8=-0.4F$ | $t_5=0.04F$ | wherein the first three columns list the lens elements numbered by roman numerals and give the corresponding refractive index N and dispersive index V and the last two columns give the radii R of the refracting surfaces, the thicknesses $t$ of the lens elements, and the spaces $s$ between the components each numbered by subscripts from front to rear and where F is the equivalent focal length of the objective and the + and − values of R indicate surfaces respectively convex and concave toward the front.

2. A photographic objective consisting of a biconcave component airspaced between two positive components and having its nodal points between the front and rear lens surfaces in which the biconcave component has a rear surface between 0.99 and 4.5 times as strongly curved as its front surface and has a focal length between 0.2 F and 0.4 F where F is the focal length of the objective and in which the outer surface of each positive component has more than half as much dioptric power as the whole component and the length of the objective from the front lens surface to the rear lens surface is between 0.3 F and 0.5 F, the objective being characterized by the biconcave component consisting of a biconcave element cemented between two positive elements and conforming to the following relationships:

$$0.1\ F < R_4 < R_5 < 0.25\ F$$
$$0.01 < (N_2-N_3) < 0.05$$
$$\pm(N_4-N_3) < 0.02$$
$$0.85\ V_3 < V_2 < 1.05\ V_3$$
$$1.5\ V_3 < V_4 < 2.0\ V_3$$

where $R_4$ and $R_5$ are the front and rear cemented surfaces of the biconcave component and where N and V denote refractive index and dispersive index respectively with subscripts 2, 3, and 4 denoting the front, center, and rear elements respectively of the biconcave component.

3. An objective according to claim 2 in which each positive component consists of a single element whose dispersive index is greater than 45, the refractive index of the front component being between 1.66 and 1.8 and that of the rear component being between 1.6 and 1.8.

FRED E. ALTMAN.
RAE WYLAND McINTYRE.

REFERENCES CITED

The following references are of record in the file of this patent:

UNITED STATES PATENTS

| Number | Name | Date |
|---|---|---|
| 1,616,765 | Sonnefeld | Feb. 8, 1927 |
| 1,825,828 | Sonnefeld | Oct. 6, 1931 |
| 1,880,394 | Altman | Oct. 4, 1932 |
| 2,171,274 | Merte | Aug. 29, 1939 |
| 2,279,384 | Altman | Apr. 14, 1942 |
| 2,336,301 | Schade et al. | Dec. 7, 1943 |

FOREIGN PATENTS

| Number | Country | Date |
|---|---|---|
| 348,783 | France | Feb. 21, 1905 |